(12) United States Patent
Li

(10) Patent No.: US 7,292,651 B2
(45) Date of Patent: *Nov. 6, 2007

(54) PILOT-AIDED CHANNEL ESTIMATION FOR OFDM IN WIRELESS SYSTEMS

(75) Inventor: Ye Li, Monmouth County, NJ (US)

(73) Assignee: AT&T Corp., New York, NY (US)

( * ) Notice: Subject to any disclaimer, the term of this patent is extended or adjusted under 35 U.S.C. 154(b) by 737 days.

This patent is subject to a terminal disclaimer.

(21) Appl. No.: 10/687,400

(22) Filed: Oct. 16, 2003

(65) Prior Publication Data

US 2004/0086055 A1    May 6, 2004

Related U.S. Application Data

(63) Continuation of application No. 09/293,631, filed on Apr. 16, 1999, now Pat. No. 6,654,429.

(60) Provisional application No. 60/114,571, filed on Dec. 31, 1998.

(51) Int. Cl.
*H03K 9/00* (2006.01)
*H04L 27/00* (2006.01)

(52) U.S. Cl. ............. 375/316; 375/349; 375/224; 375/260; 370/252

(58) Field of Classification Search ........ 375/259–260, 375/224, 285, 227, 346–347, 349–350; 370/210, 370/241, 208, 252, 281, 295
See application file for complete search history.

(56) References Cited

U.S. PATENT DOCUMENTS

| | | | | |
|---|---|---|---|---|
| 4,807,173 A | * | 2/1989 | Sommen et al. ............ 708/321 |
| 4,951,269 A | * | 8/1990 | Amano et al. ............. 367/135 |
| 5,140,615 A | * | 8/1992 | Jasper et al. .............. 375/347 |
| 5,170,413 A | * | 12/1992 | Hess et al. ............... 375/260 |
| 5,241,544 A | * | 8/1993 | Jasper et al. .............. 370/478 |
| 5,307,376 A | * | 4/1994 | Castelain et al. .......... 375/260 |
| 5,313,169 A | * | 5/1994 | Fouche et al. ............. 329/302 |
| 5,343,499 A | * | 8/1994 | Jasper et al. .............. 375/261 |
| 5,357,502 A | * | 10/1994 | Castelain et al. .......... 370/210 |
| 5,583,886 A | * | 12/1996 | Rohani et al. ............. 375/227 |
| 5,594,757 A | * | 1/1997 | Rohani ................... 375/344 |
| 5,596,608 A | * | 1/1997 | Sassa et al. .............. 375/346 |
| 5,627,863 A | * | 5/1997 | Aslanis et al. ............ 375/357 |
| 5,652,772 A | * | 7/1997 | Isaksson et al. ........... 375/367 |
| 5,666,378 A | * | 9/1997 | Marchetto et al. .......... 375/222 |
| 5,692,015 A | * | 11/1997 | Higashi et al. ............ 375/340 |
| 5,694,388 A | * | 12/1997 | Sawahashi et al. ......... 370/206 |
| 5,712,877 A | * | 1/1998 | Ho et al. ................ 375/284 |
| 5,724,388 A | * | 3/1998 | Nagano et al. ............ 375/224 |
| 5,737,327 A | * | 4/1998 | Ling et al. .............. 370/335 |
| 5,754,599 A | * | 5/1998 | Ling et al. .............. 375/340 |
| 5,764,687 A | * | 6/1998 | Easton .................. 375/147 |

(Continued)

*Primary Examiner*—Jean B. Corrielus

(57) ABSTRACT

A method and apparatus for pilot-symbol aided channel estimation in a wireless digital communication system which transmits packets of N OFDM data blocks, each data block comprising a set of K orthogonal carrier frequencies. At the transmitter, pilot symbols are inserted into each data packet at known positions so as to occupy predetermined positions in the time-frequency space. At the receiver, the received signal is subject to a two-dimensional inverse Fourier transform, two-dimensional filtering and a two-dimensional Fourier transform to recover the pilot symbols so as to estimate the channel response.

8 Claims, 12 Drawing Sheets

U.S. PATENT DOCUMENTS

| | | | | |
|---|---|---|---|---|
| 5,799,047 A | * | 8/1998 | Dobrica | 375/350 |
| 5,809,083 A | * | 9/1998 | Wright | 375/285 |
| 5,818,872 A | * | 10/1998 | Gupta | 375/222 |
| 5,822,368 A | * | 10/1998 | Wang | 375/229 |
| 5,838,268 A | * | 11/1998 | Frenkel | 341/111 |
| 5,838,740 A | * | 11/1998 | Kallman et al. | 375/346 |
| 5,909,436 A | * | 6/1999 | Engstrom et al. | 370/343 |
| 5,973,642 A | * | 10/1999 | Li et al. | 342/378 |
| 6,314,146 B1 | * | 11/2001 | Tellado et al. | 375/346 |
| 6,327,314 B1 | * | 12/2001 | Cimini et al. | 375/340 |

* cited by examiner

140

PILOT-AIDED CHANNEL ESTIMATION FOR OFDM IN WIRELESS SYSTEMS

RELATED APPLICATIONS

This application is a continuation of application Ser. No. 09/293,631, filed Apr. 16, 1999, now U.S. Pat. No. 6,654,429, which claims priority to U.S. provisional patent application No. 60/114,571, filed Dec. 31, 1998.

TECHNICAL FIELD

The present invention is directed to a method and apparatus for pilot-aided channel estimation for orthogonal frequency division multiplexed (OFDM) wireless communication systems. In particular, it concerns pilot-aided channel estimation techniques employing Fourier transforms and filtering at the receiver.

BACKGROUND OF THE INVENTION

Orthogonal frequency division multiplexing (OFDM) is a potential technique to transmit high-bit-rate data over indoor and outdoor wireless communication systems. Channel parameter estimation is an important technique to further improve data transmission performance. There are two different types of channel parameter estimators: decision-directed and pilot-symbol-aided.

Decision-directed parameter estimators have been used in OFDM systems for coherent detection, co-channel interference suppression and transmitter diversity. For systems that are noise limited or with little co-channel interference, coherent demodulation with estimated channel parameters can be used instead of differential demodulation, and can achieve a 2.5-3.0 dB signal-to-noise ratio (SNR) gain. Moreover, for systems with receiver diversity, maximal ratio diversity combining (MR-DC), which is equivalent to minimum Mean-square error diversity combining (MMSE-DC) in the absence of co-channel interference, can be achieved directly using the estimated channel parameters. For systems with co-channel interference, the coefficients for the MMSE-DC can be calculated from the estimated channel parameters and the instantaneous correlation of the signals from each receiver. For OFDM systems with transmitter diversity using space-time codes, channel estimation can provide the necessary information required for the decoding of the space-time codes.

Pilot-symbol-aided parameter estimation is another type of estimation approach. Pilot-symbol-aided channel estimation for single carrier systems with fading channels has been analyzed. Both 1-dimensional (1-D), double 1-D, and 2-dimensional (2-D) filtering algorithms have been proposed for pilot-symbol-aided parameter estimation for OFDM systems in terrestrial audio and television broadcasting, fixed and mobile wireless communications. However, the filtering algorithms for pilot-symbol-aided parameter estimation require channel statistics, such as, the delay profile and the Doppler frequency, which are usually unknown in wireless environments. Prior art patents have suggested time or frequency domain correlation using pilot symbols.

U.S. Pat. No. 5,692,015 to Higashi et al. is directed to pseudo-pilot-symbol aided channel estimation in a single carrier system. At the receiver, the channel transfer function associated with each pseudo-pilot symbol is estimated and a time-domain interpolation is carried out to determine the remaining channel transfer functions.

U.S. Pat. No. 5,809,083 to Wright discloses the use of a periodically transmitted pair of pilot symbols spaced apart by a fixed difference in a single-carrier system. The pilot symbols are used to synchronize the transmitter and receiver and are also used in channel estimation. Only the pair of pilot symbols is processed by the channel estimator. Specifically, the channel estimator compares the current channel-impaired received pilot symbols with their expected amplitude and phase, and the average amplitude and phase distortion is used to estimate the effects of the channel. Average estimates obtained over multiple such periods are then interpolated or otherwise filtered to generate symbol-specific amplitude and phase adjustments to apply to the channel-impaired data symbols. However, this technique does not address the issue of OFDM communication and does not account for the simultaneous effect of Doppler and multipathing.

U.S. Pat. No. 5,307,376 to Castelain et al. is directed to pilot-aided channel parameter estimation in an OFDM system. Pilot symbols are broadcast using higher power than the remaining symbols in a data stream. At the receiver, the noisy channel parameters are subject to an inverse DFT, weighting and thresholding so as to focus on the pilot symbols, and the result is then subjected to a DFT. While Castelain '376 provides frequency domain interpolation, it does not perform this in the time-domain. Therefore, this technique does not provide channel estimates which are robust to both Doppler and delay profiles due to multipathing.

SUMMARY OF THE INVENTION

The present invention is directed to realizing robust parameter estimation for a channel in a synchronized OFDM communication system which is robust to both Doppler and multipathing. At the transmitter, pilot symbols are selectively inserted in predetermined frequency bins (tones) of each of a number of OFDM blocks, and a plurality of such OFDM blocks are sequentially broadcast. At a receiver antenna, the plurality of OFDM blocks are processed, and the resulting signal used to form a noisy two-dimensional channel estimate, one dimension corresponding to a frequency index of the OFDM tones within each block and a second dimension corresponding to a time index of each OFDM block. The noisy two-dimensional channel estimate is then subject to two 2-D Fourier transforms, and a diamond-shaped filter between them, thereby producing a noise-reduced channel estimate.

An additional facet of the present invention is that it may be adapted for use in mobile or diversity receivers having a plurality of receiving antennas. In such case, signals received at the various antennas are used to form a single channel estimate which is then used to combine the signals to arrive at an optimum estimate of the transmitted signal.

BRIEF DESCRIPTION OF THE DRAWINGS

The present invention can better be understood through the attached figures in which:

FIG. 4b shows the contour of a 2-D spectrum for the sample pilot symbol grid of FIG. 4a;

DETAILED DESCRIPTION OF THE PREFERRED EMBODIMENT

The aforementioned U.S. Pat. Nos. 5,307,376, 5,692,015 and 5,809,083 are incorporated by reference herein.

Figure 1:
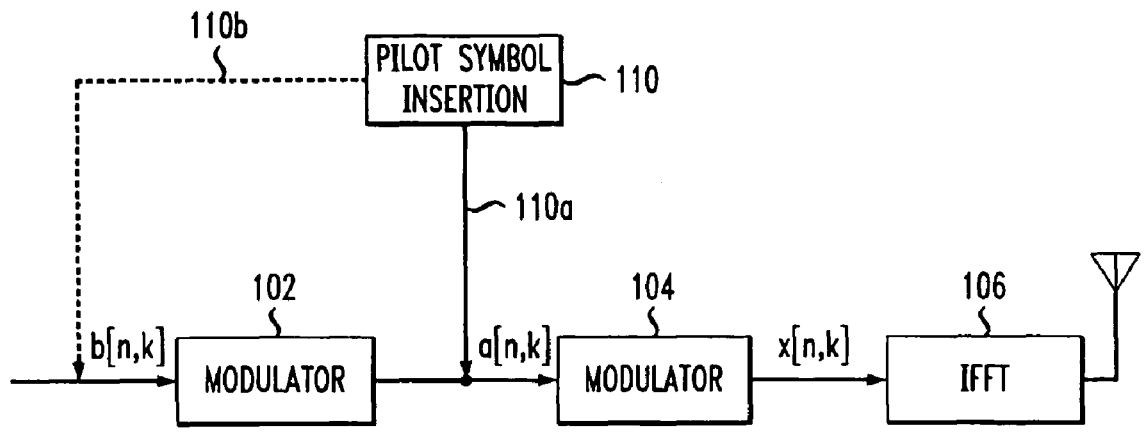
FIG. 1 is a block diagram of a transmitter in accordance with the present invention.

FIG. 1 shows an OFDM transmitter 100 in accordance with the present invention. A signal $b[n,k]$ in which the indices k and n represent the $k^{th}$ tone of the $n^{th}$ block of an OFDM sequence, respectively, is presented to an encoder 102. The encoded signal $a[n,k]$ is then presented to the modulator 104. In the preferred embodiment, since the phase of each tone can be obtained by the estimator, coherent phase-shift keying (PSK) modulation is used to enhance the system performance. The modulated signal $x[n,k]$ is then subject to an inverse fast Fourier transform (IFFT) 106 before being broadcast by an antenna 108, in accordance with well-established techniques for OFDM transmission protocol.

Before it is broadcast, signal $x[n,k]$ has embedded therein a plurality of pilot symbols which have been added by a pilot symbol insertion block 110. Pilot symbol insertion may take place just before modulation 104, as indicated by the solid line 110a, or it may take place just before encoding 102, as indicated by the broken line 110b. Regardless of the particular stage within the transmitter that pilot symbols are inserted, the positions of the pilot symbols in the resulting sequence of OFDM blocks is important in the present invention, as discussed further below.

Figure 2:
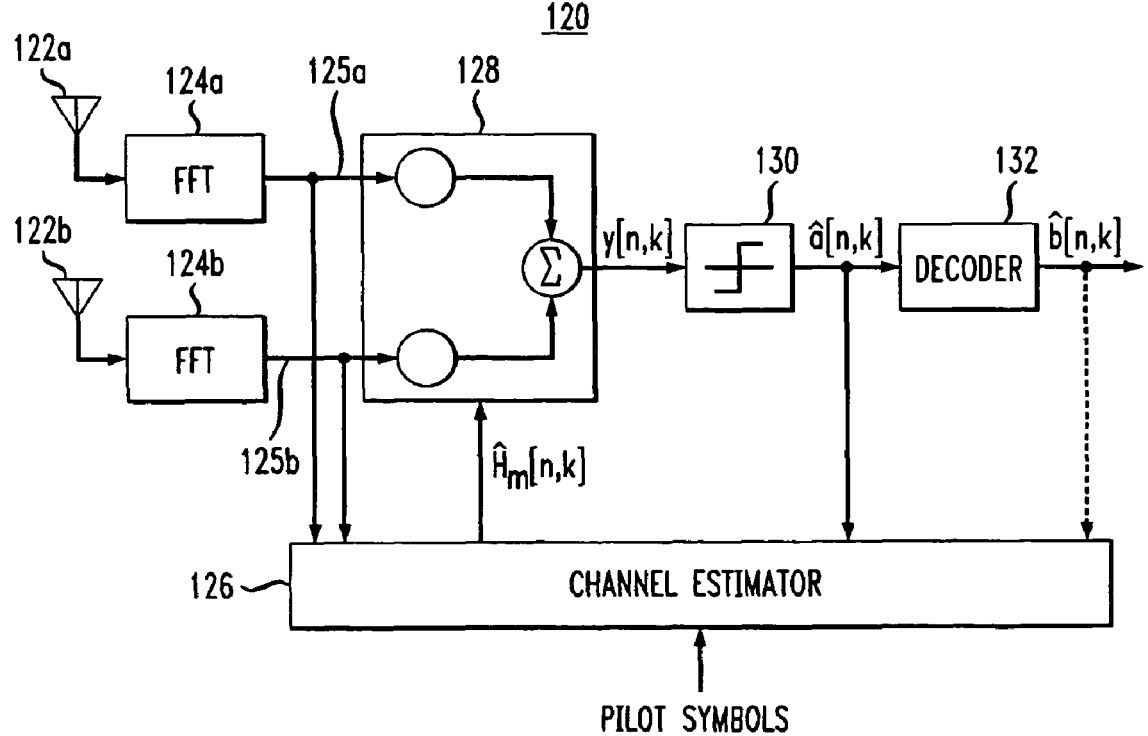
FIG. 2 is a block diagram of a receiver in accordance with the present invention.

FIG. 2 shows a receiver 120 in accordance with the present invention. The receiver 120 is provided with a plurality of antennas 122a, 122b. The received signal at antennas 122a, 122b is subjected to a fast Fourier transform (FFT) 124a, 124b to thereby produce respective channel-corrupted signals $x_1[n,k]$, $x_2[n,k]$ on lines 125a, 125b. While two antennas and two signals are shown, it should be kept in mind that any number p of such antennas may be present in a mobile diversity receiver. It should also be noted that a channel estimator in accordance with the present invention will work even if only a single antenna is used.

The received signals $x_m[n,k]$ are sent on to a channel estimator 126 to estimate channel parameters. The estimated channel parameters, in turn, are used in combination with the received signals in a diversity combiner 128 to form a combined signal $y[n,k]$. Combined signal $y[n,k]$ is then subjected to a thresholder 130 to thereby produce an estimate of the demodulated signal $\hat{a}[n,k]$. The estimate of the demodulated signal $\hat{a}[n,k]$ is input to a decoder 132 to thereby produce an estimate of the decoded signal $\hat{b}[n,k]$. The estimate of the demodulated signal $a[n,k]$ is also input to the channel estimator to refine the estimate of the combined signal $y[n,k]$. Alternatively, in the event that the pilot symbols were inserted before encoding at the transmitter 100, the decoded signal $\hat{b}[n,k]$ may be used in place of the estimate of the demodulated signal, as indicated by the broken line in FIG. 2.

In general, for a diversity receiver such as that shown in FIG. 2, the signal from the $m^{th}$ antenna at the $k^{th}$ tone of the $n^{th}$ block can be expressed as:

$$x_m[n,k] = H_m[n,k]a[n,k] + w_m[n,k] \quad \text{(Eq. 1)}$$

In the above expression, $w_m[n,k]$ is additive Gaussian noise from the $m^{th}$ antenna (m=1, 2, 3, ..., p) at the $k^{th}$ tone of the $n^{th}$ OFDM block having zero-mean and variance ρ. It is also assumed that $w_m[n,k]=s$ are independent for different n=s, k=s and m=s, i.e., for each antenna, the noise has the same statistics at all tones k in each OFDM block n. $H_m[n,k]$ is the frequency response at the $k^{th}$ tone of the $n^{th}$ block corresponding to the $m^{th}$ antenna, and is assumed to be independent for different m=s but with the same statistics. Finally, $a[n,k]$ is the signal modulating the $k^{th}$ tone during the $n^{th}$ block and is assumed to have unit variance and be independent for different k=s and n=s.

If the transmitted symbols for some k=s and n=s are known at the receiver, the channel parameters corresponding to these k=s and n=s ("initial channel parameters") can be estimated by:

$$\tilde{H}_m[n,k] \triangleq x_m[n,k]a^*[n,k] = H[n,k] + \bar{w}_m[n,k] \quad \text{(Eq. 2)}$$

where $\bar{w}_m[n,k] = w_m[n,k]a^*[n,k]$.

From the temporal estimation of the channel parameters for some k=s and n=s, a robust interpolator can be derived to estimate the channel parameters for all k=s and n=s, even if the channel statistics are unknown.

The receiver 120 further includes a channel estimator 140 which first calculates the noisy channel estimates $\tilde{H}_m[n,k]$ and further processes the noisy channel estimates to arrive at a noise-reduced channel estimate $\hat{H}_m[n,k]$ in accordance with the present invention.

Figure 3:
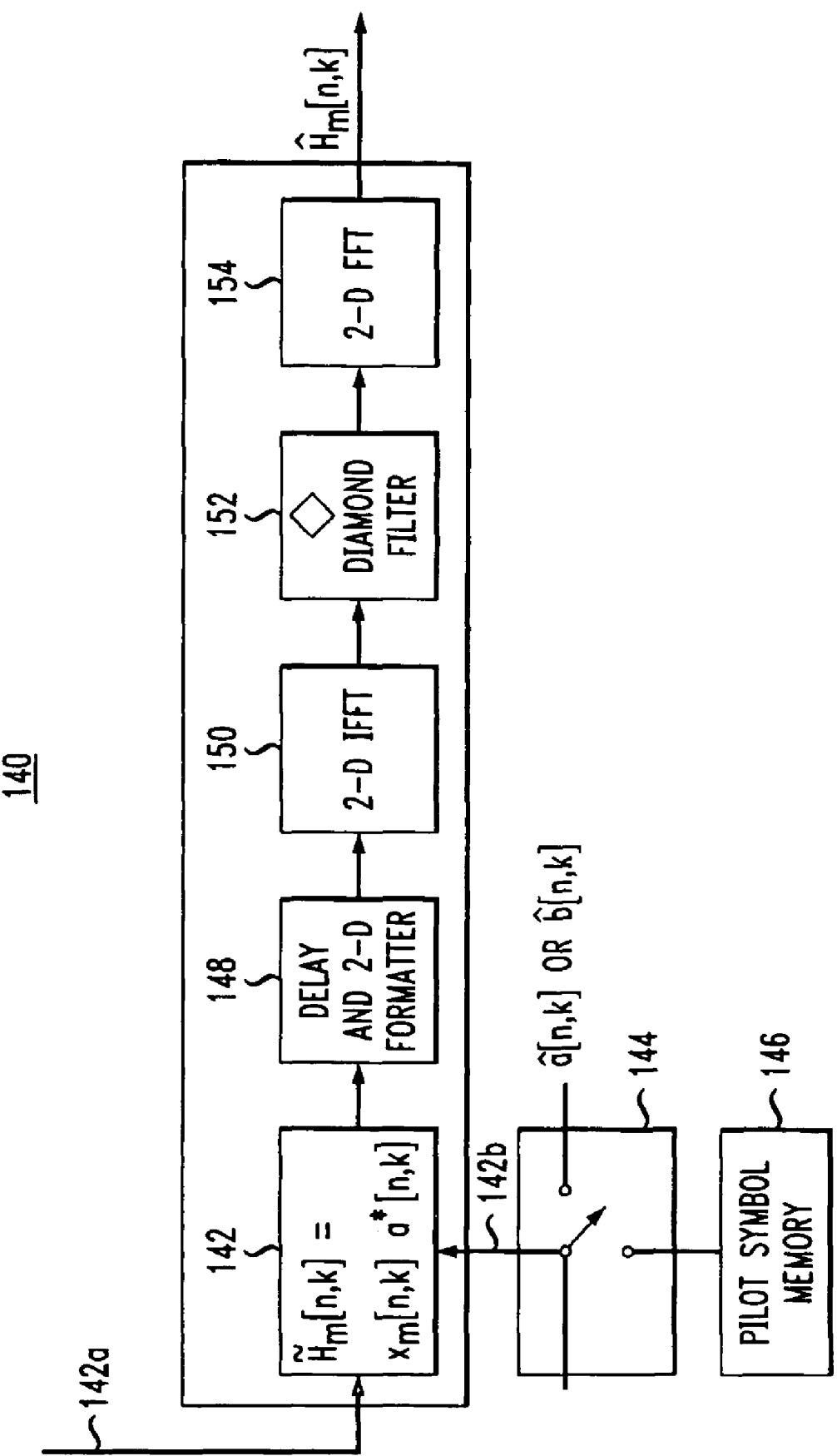
FIG. 3 is a block diagram of a channel estimator in accordance with the present invention.

FIG. 3 shows a block diagram of a channel estimator 140 in accordance with the present invention. The channel estimator includes a multiplier 142 which calculates the noisy channel estimate $\tilde{H}_m[n,k]$ from a received signal $x_m[n,k]$ on line 142a and a selected reference signal $a^*[n,k]$ received on line 142b from switch 144. When the receiver is processing the first sequence of OFDM blocks, the reference signal is selected to be the known pilot symbols for certain n=s and k=s transmitted by the transmitter in this synchronized communication system. In such case, the known pilot symbols are retrieved from a local pilot symbol memory 146 associated with the receiver. When the receiver is processing a subsequent sequence of OFDM blocks, the reference signal is the estimate of the demodulated signal $\hat{a}[n,k]$ or, alternatively, the estimate of the decoded signal $\hat{b}[n,k]$. It should be understood here that multiplier 142 and switch 144 are preferably implemented in software.

The noisy channel estimate $\tilde{H}_m[n,k]$ is sent on to a delay and formatting device 148. Here, noisy channel estimates for all K frequencies of N successive OFDM blocks are assembled into a two-dimensional array $\tilde{G}_m[n_1,n_2]$ wherein $n_1$ denotes the frequency index and $n_2$ the time index. In the array, each OFDM block occupies a single row with the corresponding frequencies being aligned along the columns with the row number of the OFDM blocks corresponding to the time sequence in which the OFDM blocks were received. The formatter 148 then zero-pads both the rows and the columns, if needed, so that each has a number of elements that is a power of two.

The two-dimensional array $\tilde{G}_m[n_1,n_2]$ is then sent on to a 2-D IFFT unit 150 where a two-dimensional transform is performed to form $\tilde{G}_m[f_1,f_2]$. The output of the IFFT unit 150 is sent on for frequency domain filtering by multiplying by a filter 152 to form $\hat{G}_m[f_1,f_2]$. The output of the filter 152 is then sent on to a 2-D FFT unit 154 to form $\hat{G}_m[n_1,n_2]$ from which one can extract the noise-reduced channel estimates $\hat{H}_m[n,k]$.

Since the 2-D spectrum is usually of a diamond shape, a diamond shape filter is preferably used to filter out the additive noise which often occupies the 2-D region corresponding to high Doppler and high time delay. The area of the diamond is designed to match the maximum delay spread and Doppler frequency. Consequently, the estimation performance is insensitive to different delay profiles and Doppler frequencies, and so provides a robust estimator.

In view of the foregoing, it is evident that, initially, from the pilot symbols, one can obtain temporal estimated channel parameters corresponding to the pilot symbol positions. Then the channel parameters corresponding to the other positions are obtained by interpolation using a 2-D IFFT, filtering and a 2-D FFT. In the present estimator, the 2-D transforms and the multiplication are preferably performed using DSP chips, dedicated hardware, or the like. For instance, a single DSP chip can perform both 2-D FFTs.

With the estimated channel parameters $\hat{H}_m[n,k]$, a minimum mean square diversity combiner 128 can be used to combine the received signals $x_m[n,k]$ to estimate the combined signal as:

$$y[n,k] = \frac{\sum_{m=1}^{p} \hat{H}_m^*[n,k] x_m[n,k]}{\sum_{m=1}^{p} |\hat{H}_m[n,k]|^2} \qquad \text{(Eq. 3)}$$

The operation of the receiver 120 may now be explained with reference to the above equations and the channel estimator 140. As discussed above, the transmitter 100 and receiver 120 are synchronized so as to permit coherent signal detection. Therefore, the receiver knows the positions of the pilot symbols in any given OFDM block. During the first transmission of a sequence of OFDM blocks, the receiver uses only the known pilot symbol positions in the received signals $x_m[n,k]$, along with the known amplitudes and phases of the pilot symbols. During this first transmission, the receiver calculates a noisy estimate of the channel parameters in accordance with Eq. 2 to create $\tilde{H}_m[n,k]$ for just the known pilot symbol positions in the first sequence of OFDM blocks. A two-dimensional matrix $\tilde{G}_1[n_1,n_2]$ comprising the calculated noisy channel parameters for the known pilot symbol positions, and zero-padded values for the remaining positions is formed. Matrix $\tilde{G}_1[n_1,n_2]$ is subjected to an IFFT, a diamond-shaped filter and an FFT to form the filtered channel estimation matrix $\hat{G}_1[n_1,n_2]$ which comprises the initial noise-reduced channel estimates $\hat{H}_m[n,k]$ received at the $m^{th}$ antenna. The noise-reduced initial channel estimates are then used in Eq. 3 to estimate the combined signal $y_1[n,k]$ and the demodulated signal $\hat{a}_1[n,k]$.

For a subsequent sequence of OFDM blocks, the receiver calculates a noisy enhanced channel estimate in accordance with Eq. 2 to create $\tilde{H}_m[n,k]$ using the m received signals $x_m[n,k]$ and the values of the estimated demodulated signal, rather than for only the n=s and k=s corresponding to the known pilot symbols. The same 2-D matrix is formed and subjected to an IFFT, a diamond filter and an inverse FFT to provide the noise-reduced enhanced channel estimates $\hat{H}_m[n,k]$ for submission to Eq. 3, as before.

After the initial channel estimate has been calculated, the positions of the pilot symbols do not solely determine the data that is used in calculating the enhanced channel estimates. Instead, the entire estimated demodulated signal is used in this calculation, and the channel estimate is optimum for that transmission. If, however, a transmission of a first set of sequences of OFDM blocks has concluded, and there is a time delay before a second set is transmitted, the previously estimated demodulated signal may not be suitable for use in the calculation of Eq. 2. In such case, for the second set of transmissions, it may be desirable to calculate a noise-reduced initial channel estimate using only the positions of the pilot symbols as explained above, and thereafter use the estimated demodulated signal for the subsequent noise-reduced enhanced channel estimates.

In the present invention, at the OFDM transmitter, the pilot symbols are selectively inserted at predetermined tones in members of a sequence, or packet, of OFDM blocks. More particularly, the pilot symbol inserter 110 is configured to insert pilot symbols into successive OFDM blocks such that a predetermined pattern is produced on a two-dimensional grid formed from several rows of OFDM blocks, each row comprising the K tones of a corresponding block, each column comprising the signal at a particular tone for each of N OFDM blocks, with adjacent rows corresponding to adjacent OFDM blocks in the time domain. The placement of the pilot symbols is considered next.

As discussed in P. Hoeher, S. Kaiser and P. Robertson, *Two-dimensional-pilot-symbol-aided channel estimation by Wiener filtering*, Proc. of 1997 IEEE International Conf. of Acoustics, Speech and Signal Processing, Munich, Germany, April 1997, pp 1845-1848 [1], and in P. Hoeher, S. Kaiser and P. Robertson, *Pilot-symbol-aided channel estimation in time and frequency*, Proc. of 1997 IEEE Global Telecomm. Conf: Comm. The. Mini-Conf, Phoenix, Ariz., November 1997, pp 90-96 [2], the grid density of the pilot symbols must satisfy the 2-D sampling theorem in order to recover channel parameters. For an OFDM signal, then, this means that the following must be satisfied:

$$f_{dmax} T_f M_t \leq 1/2; \tau_{max} \Delta_f M_f \leq 1/2 \qquad \text{(Eq 4)}$$

where $f_{dmax}$ and $\tau_{max}$ are the maximum expected Doppler shift and maximum expected time delay, respectively; $T_f$ and $\Delta_f$ represent the block length and the tone spacing, respectively, and $M_t$ and $M_f$ denote the spaces between the time and frequency domains, respectively. It is suggested in the aforementioned articles that a twice oversampling rate for the pilot symbols be used to suppress channel noise and improve the estimation performance at the expense of reduced efficiency of the data transmission.

In the aforementioned articles by P. Hoeher, S. Kaiser and P. Robertson, the authors studied parameter interpolation using Wiener filtering or the MMSE interpolation. These approaches to interpolation require information about the channel statistics. This contrasts with the present invention which provides for robust interpolation that is insensitive to channel statistics. The 2-D FFT and IFFT can be used to implement robust interpolation and reduce the computational complexity. However, in order to reduce edge effects, square-root raised cosine extensions are used on the edges of the 2-D signal, as disclosed in U.S. Pat. No. 5,357,502, whose contents are also incorporated by reference herein.

For wireless systems with packet data transmission, each packet may consist of only a few OFDM blocks. Therefore, the channel time-domain spectrum will be spread. For the same reason, the frequency-domain spectrum will also be spread due to a finite number of tones in each OFDM block. One may therefore increase the number of pilot symbols to reduce spectral aliasing at the expense of reduced efficiency of the data transmission. However, for a given rate of pilot symbols, we may also improve performance by the choice of the pilot symbol grid shape.

A rectangular grid shape in which pilot symbols are inserted periodically at the same tones in each of a number OFDM blocks is less preferable because such pattern does not efficiently capture variation in both the time delay and Doppler. In the present invention, one preferably uses a non-rectangular grid shape to take advantage of the two-dimensional filtering that is used in the estimator. The 2-D spectrum of a regular, non-rectangular pilot grid is discussed in the article R. M. Mersereau and T. C. Speake, *The Processing of Periodically Sampled Multidimensional Signals*, IEEE Trans. on Signal Processing, vol. 31, pp. 188-194, February, 1983 [3].

Figure 4A:
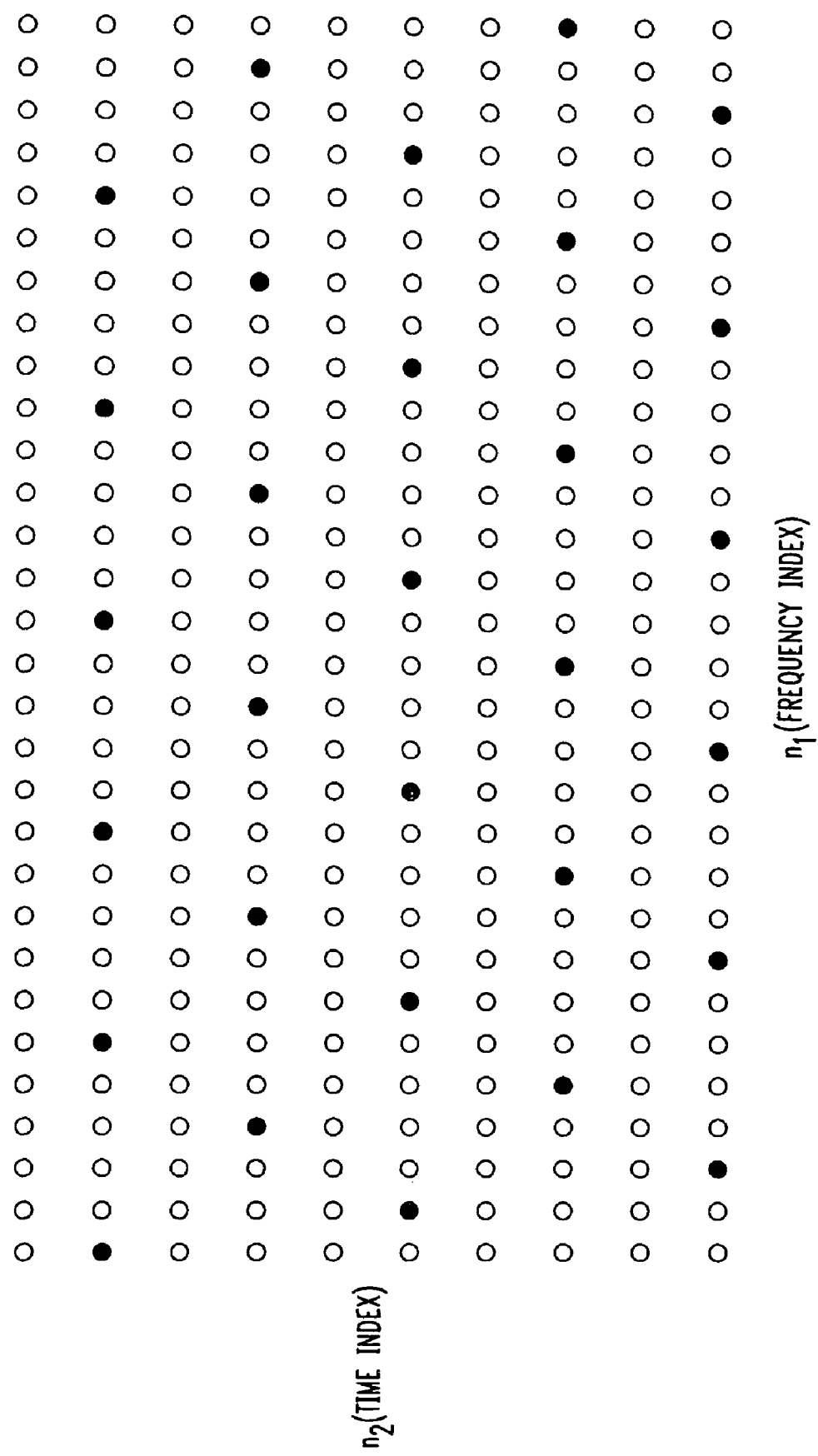
FIG. 4a shows a sample pilot symbol grid used for a system in accordance with the present invention.
Figure 4B:
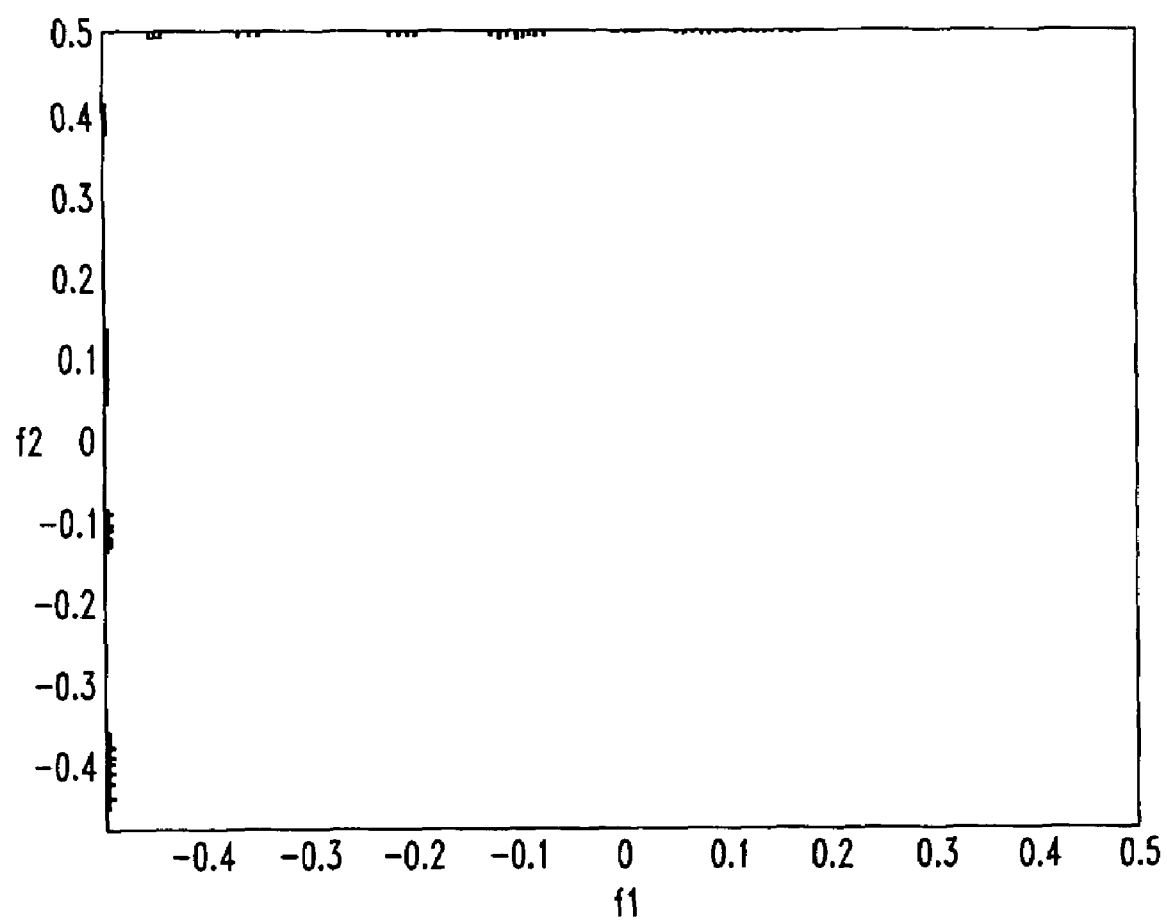

FIG. 4a shows a sample non-rectangular pilot symbol grid and FIG. 4b shows its corresponding 2-D spectrum contour. As seen in FIG. 4a, the pilot symbols are not necessarily inserted into adjacent rows, i.e., successive OFDM blocks. In addition, the pilot symbols in one OFDM block do not occupy the same tones as the pilot symbols in a nearby OFDM block, but rather are staggered relative thereto, thereby providing the non-rectangular pilot-symbol grid pattern. One skilled in the art will recognize from FIG. 4b that if a rectangular pilot symbol grid is used, there will be aliasing of its 2-D spectrum.

Theoretical Performance

As indicated above, with pilot symbols, temporal estimation of the corresponding parameters can be obtained. The channel parameters corresponding to the regular symbols (unknown data) can be obtained by interpolation. The optimum interpolation is determined by the channel statistics that are usually difficult to obtain since they depend on the environment and vehicle speed. We now demonstrate that the present invention results in a robust interpolator.

MMSE Interpolation. The channel parameter $H[p_1, p_2]$, which is a two-dimensional sequence, will be written as $H[p]$ for simplicity, where $p \triangleq (p_1, p_2)^T$ denotes a 2-element integer vector. From now on, the subscript m for antenna is omitted since the channel estimators are the same for different antennas. From the pilot symbols with any regular grid, we can get temporal estimation of the channel parameters, $$\tilde{H}[Vp] = H[Vp] + \bar{\omega}[Vp], \qquad (Eq.~5)$$

for all p, where V is a non-singular 2×2 matrix that is determined by the pilot symbol grid. For the grid shown in FIG. 3(a), $$V = \begin{pmatrix} 2 & 5 \\ 2 & 0 \end{pmatrix}. \qquad (Eq.~6)$$

For any 2-element integer vector $n = (n_1, n_2)^T$, there is a unique pair of p and $\tilde{r}$ I (where I is a set of |det(V)| 2-element integer vectors determined by V), such that $$n = Vp + r \qquad (Eq.~7)$$

From the temporal estimation, $H[n]$, for any n, can be estimated by $$\hat{H}[n] = \sum_{p_o} c[r + V(p - p_o)] \tilde{H}[Vp_o], \qquad (Eq.~8)$$

where the c[n]'s are two-dimensional coefficients. Using the orthogonality principle, the coefficients for the MMSE estimator are determined by solving $$E\left\{ \left(H[n] - \sum_{p_o} c[r + V(p - p_o)]\tilde{H}[Vp_o]\right) \tilde{H}^*[Vp_1] \right\} = 0, \qquad (Eq.~9)$$

for all $p_1$, or $$r[Vp + r] = \sum_{p_o} c[r + V(p - p_o)](r[Vp_o] + \rho\delta[p_o]), \qquad (Eq.~10)$$

where $\rho = E\{|\bar{\omega}[Vp]|^2\}$

Denote $$R(r, \omega) \triangleq \sum_p r[Vp + r]e^{-j\omega^T Vp}, \qquad (Eq.~11)$$

$$C(r, \omega) \triangleq \sum_p c[Vp + r]e^{-j\omega^T Vp}, \qquad (Eq.~12)$$

where $\omega = (\omega_1, \omega_2)^T$. Then, (10) can be expressed in the frequency domain as $$R(r, \omega) = C(r, \omega)(R(0, \omega) + \rho). \qquad (Eq.~13)$$

Therefore, $$C(r, \omega) = \frac{R(r, \omega)}{R(0, \omega) + \rho}. \qquad (Eq.~14)$$

Let $R(\omega)$ be the 2-D Fourier transform of $r[n]$ defined as $$R(\omega) = \sum_n r[n]e^{-j\omega^T n}, \qquad (Eq.~15)$$

Then, we have $$R(r, \omega) = \sum_p r[Vp + r]e^{-j\omega^T Vp} \qquad (Eq.~16)$$

$$= \sum_p \left\{ \frac{1}{(2\pi)^2} \int_{-\pi}^{\pi}\int_{-\pi}^{\pi} R(\omega_n)e^{j\omega_o^T(Vp+r)} d\omega_1^o d\omega_2^o \right\} e^{j\omega^T Vp}$$

-continued $$= \frac{1}{(2\pi)^2} \int_{-\pi}^{\pi}\int_{-\pi}^{\pi} R(\omega_o)\left\{\sum_p e^{-j(\omega-\omega_o)^T Vp}\right\} e^{j\omega_o^T r} d\omega_1^o d\omega_2^o,$$

with $\omega_0=(\omega_1^o,\omega_2^o)$. Since, $$\sum_p e^{-j(\omega-\omega_o)^T Vp} = (2\pi)^2 \sum_p \delta(V^T\omega - V^T\omega_o - 2\pi p). \quad \text{(Eq. 17)}$$

Then, $$R(r,\omega) = \frac{1}{(2\pi)^2}\int_{-\pi}^{\pi}\int_{-\pi}^{\pi} R(\omega_o)(2\pi)^2 \sum_{p\in Z^2} \quad \text{(Eq. 18)}$$
$$\delta(V^T\omega - V^T\omega_o - 2\pi p) \cdot e^{j\omega^T r} d\omega_1^o d\omega_2^o$$
$$= \frac{1}{|\det(V)|} \sum_{\omega - 2\pi U p \in [-\pi,\pi]^2} R(\omega - 2\pi Up) e^{j(\omega - 2\pi Up)^T r}$$

with $U=V^{-1}$.

From (18), we have that $$C(\omega) \triangleq \sum_{r\in I} C(r,\omega)e^{-j\omega^T r} = \sum_{r\in I}\frac{1}{|\det(V)|}\sum_{\omega-2\pi Up\in[-\pi,\pi]^2} \quad \text{(Eq. 19)}$$
$$\frac{R(\omega - 2\pi Up)e^{j(\omega-2\pi Up)^T r}}{R(0,\omega)+\rho}e^{j\omega^T r}$$
$$= \frac{1}{|\det(V)|}\sum_{\omega-2\pi Up\in[-\pi,\pi]^2}\frac{R(\omega-2\pi Up)}{R(0,\omega)+\rho}\sum_{r\in I}e^{j2\pi(Up)^T r}.$$

It can be proven from the property of I that $$\sum_{r\in I} e^{-j2\pi(Up)^T r} = \begin{cases} |\det(V)|, & \text{if } p=(0,0)^T, \\ 0, & \text{otherwise.} \end{cases} \quad \text{(Eq. 20)}$$

Consequently, $$C(\omega) = \frac{R(\omega)}{R(0,\omega)+\rho}. \quad \text{(Eq. 21)}$$

If the pilot symbols are dense enough to make $R(r,\omega)$ alias-free, then $$R(0,\omega) = \frac{R(\omega)}{|\det(V)|}$$

within the non-zero support of $R(\omega)$ and $$C(\omega) = \frac{R(\omega)}{\frac{R(\omega)}{|\det(V)|}+\rho}, \quad \text{(Eq. 22)}$$

which implies that the optimum parameter interpolator can be determined once the channel statistics are known.

Mean-Square Error (MSE). The MSE for the optimum interpolation can be found by $$mse_o = E\left\{\left|h[Vp+r] - \sum_{p_o\in Z^2} c[r, V(p-p_o)]\tilde{h}[Vp_o]\right|^2\right\} \quad \text{(Eq. 23)}$$
$$= E\left\{h[Vp+r] - \sum_{p_o\in Z^2} c[r, V(p-p_o)]\tilde{h}[Vp_o]h^*[Vp+r]\right\}$$
$$= r[0] - \sum_{p_o\in Z^2} c[r, V(p_o)]r^*[Vp_o+r]$$
$$= 1 - \frac{1}{(2\pi)^2}\int_{-\pi}^{\pi}\int_{-\pi}^{\pi}\frac{|R(r,\omega)|^2}{R(0,\omega)+\rho}d\omega_1 d\omega_2.$$

If the pilot symbols satisfy the alias-free condition, then $|R(r,\omega)|^2=|R(0,\omega)|^2$. Furthermore, there are $|\det(V)|$ replicas of $$\frac{1}{|\det(V)|}$$

$R(\omega)$ within $[-\pi,\pi]\times[-\pi,\pi]$. Let the non-zero support of $R(\omega)$ be D with area S, then $$mse_o = 1 - \frac{|\det(V)|}{(2\pi)^2}\int\int_D \frac{|R(0,\omega)|^2}{R(0,\omega)+\rho}d\omega_1 d\omega_2 \quad \text{(Eq. 24)}$$
$$= \frac{1}{(2\pi)^2}\int\int_D R(\omega)d\omega_1 d\omega_2 - \frac{|\det(V)|}{(2\pi)^2}$$
$$\int\int_D \frac{\frac{R(\omega)}{|\det(V)|^2}}{\frac{R(\omega)}{|\det(V)|}+\rho}d\omega_1 d\omega_2$$
$$= \frac{\rho}{(2\pi)^2}\int\int_D \frac{R(\omega)}{\frac{R(\omega)}{|\det(V)|}+\rho}d\omega_1 d\omega_2$$

If $R(\omega)$ is ideal low-pass, that is $$R_r(\omega) = \begin{cases} \frac{(2\pi)^2}{S} & \text{if } (\omega_1,\omega_2)^T \in D, \\ 0, & \text{otherwise,} \end{cases} \quad \text{(Eq. 25)}$$

then $$mse_r = \frac{\rho}{\frac{(2\pi)^2}{S|\det(V)|} + \rho}. \quad \text{(Eq. 26)}$$

For any $R(\omega)$ with non-zero support D and satisfying $$\frac{1}{(2\pi)^2} \int\int_D R(\omega) d\omega_1 d\omega_2 = 1 \quad \text{(Eq. 27)}$$

we have $$mse_o = \rho \frac{S}{(2\pi)^2} \frac{1}{S} \int\int_D \frac{R(\omega)}{\frac{R(\omega)}{|\det(V)|} + \rho} d\omega_1 d\omega_2 \quad \text{(Eq. 28)}$$

$$\leq \rho \frac{1}{(2\pi)^2} \frac{\frac{1}{S}\int\int_D R(\omega) d\omega_1 d\omega_2}{\frac{1}{S}\int\int_D \frac{R(\omega)}{|\det(V)|} d\omega_1 d\omega_2 + \rho}$$

$$= \frac{\rho}{\frac{(2\pi)^2}{S|\det(V)|} + \rho} = mse_r,$$

where we have used the fact that $$\frac{x}{x+\rho}$$

is a convex function for $x>0$. The inequality (28) implies that of all $R(\omega)$ with non-zero support D, the channel with the ideal bandlimited 2-D spectrum has the worst performance.

Robust interpolation. The MMSE interpolation derived in the previous section requires channel statistics that are usually unknown since it changes with the environment and vehicle speed. Hence, a robust interpolator that is independent of the channel statistics is desired.

For an interpolator matching the 2-D spectrum $R(\omega)$ and a channel with 2-D spectrum $\bar{R}(\omega)$, the MSE of the interpolator will be $$mse = \frac{\sigma^4}{(2\pi)^2} \int\int_D \frac{\bar{R}(\omega) - R(\omega)}{\left(\frac{R(\omega)}{|\det(V)|} + \rho\right)^2} d\omega_1 d\omega_2 + mse_o. \quad \text{(Eq. 29)}$$

The first term in the above equation is the MSE increment due to the mismatch of the channel statistics and the estimator. However, if $R(\omega)=R_r(\omega)$ then $mse=mse_o$ and the performance of the interpolator does not depend on the channel statistics. We call the interpolator that matches $R_r(\omega)$ a robust interpolator. The robust interpolator can be shown as in FIG. 3. Since the 2-D spectrum is usually of a diamond shape, a diamond shape filter is used to filter out the additive noise.

Enhanced parameter estimation. If an M times oversampling rate is used for the pilot symbols, then $S=(2\pi)^2/M$ and from Eq. (26), the MSE of the robust channel estimator will be $$mse_r = \frac{\rho}{M+\rho} \approx \frac{\rho}{M} \quad \text{(Eq. 30)}$$

An enhanced channel parameter estimation algorithm as discussed in Y. (Geoffrey) Li an N. Sollenberger, *Interference suppression in OFDM systems using adaptive antenna arrays,* 1998 Global Telecomm. Conf.: Comm. The. Mini-Conf, Sydney, Australia, November 1998 [4], can be used here to improve the performance of the channel parameter estimation. Based on the initial parameter estimation using the pilot symbols, the transmitted symbols can be coherently detected, and therefore the temporal estimation for all k's and n's can be obtained with the help of the detected symbols. Better parameter estimation can then be obtained from the temporal parameter estimator. If all detected symbols are correct, then from (26) the MSE of the enhanced parameter estimator is $$mse_e = \frac{\rho}{\frac{(2\pi)^2}{S}+\rho} \approx \frac{\rho}{\frac{(2\pi)^2}{S}}. \quad \text{(Eq. 31)}$$

Since $$\frac{(2\pi)^2}{S}$$

is usually much larger than M, the enhanced estimation can significantly improve the system performance even though there are symbol detection errors and edge effects, as demonstrated by the simulations described below.

The simulation uses channels having one of three delay profiles: (1) the two-ray delay profile of Y. (Geoffrey) Li, J. H Winters and N. R. Sollenberger, *Spatial-temporal equalization for IS-136 TDMA systems with rapid dispersive fading and co-channel interference,* IEEE Trans. on Veh. Tech., to be published [5]; (2) typical-urban (TU) delay profile and (3) hilly-terrain (HT) delay profile, both discussed in Y. (Geoffrey) Li, N. Seshadri and S. Ariyavisitakul, *Transmitter diversity in OFDM systems with dispersive fading channels,* presented at 1998 IEEE Global Telecomm. Conf., Sydney Australia, November 1998 [6] and also in Y. (Geoffrey) Li, N. Seshadri and S. Ariyavisitakul, *Channel estinmation for transmitter diversity in OFDM systems with mobile wireless channels,* IEEE J-SAC Wireless Comm. Series, to be published [7]. Each of the three delay profiles was considered with both 40 Hz and 200 Hz Doppler frequencies. The channels corresponding to different receivers have the same statistics and two antennas are used for receiver diversity.

The parameters for the OFDM system are the same as those in Y. (Geoffrey) Li, L. Cimini and N. Sollenberger, *Robust Channel Estimation for OFDM systems with rapid dispersive fading channels,* IEEE Trans. on Comm., vol. 46, pp. 902-915, July 1998 [8]. To construct an OFDM signal, assume the entire channel bandwidth, 800 kHz, is divided into 128 tones. The 4 tones on each end are used as guard tones, and the rest (120 tones) are used to transmit data. To make the tones orthogonal to each other, the symbol duration is 160 μsec. An additional 40 μsec guard interval is used to provide protection from intersymbol interference due to channel multipath delay spread. This results in a total block length T=200 μsec and a subchannel symbol rate $r_b$=kbaud.

PSK modulation with coherent demodulation is used. As in reference [8], a (40,20) R-S code, with each code symbol consisting of 3 QPSK symbols grouped in frequency, is used in the system. The R-S decoder erases 10 symbols based on the signal strength and corrects 5 additional random errors. The system is in packet transmission mode with each packet containing 10 OFDM blocks. Pilot symbols are inserted in the system at a 10% rate with the grid shown in FIG. 4a. Hence, the simulated system can transmit data at 1.08 Mbits/sec before decoding, or 540 kbits/sec after decoding, over an 800 kHz channel. To get insight into the average behavior of the channel estimator, the performance was averaged over 10,000 OFDM blocks.

Effects of Different References on System Performance

Figure 5A:
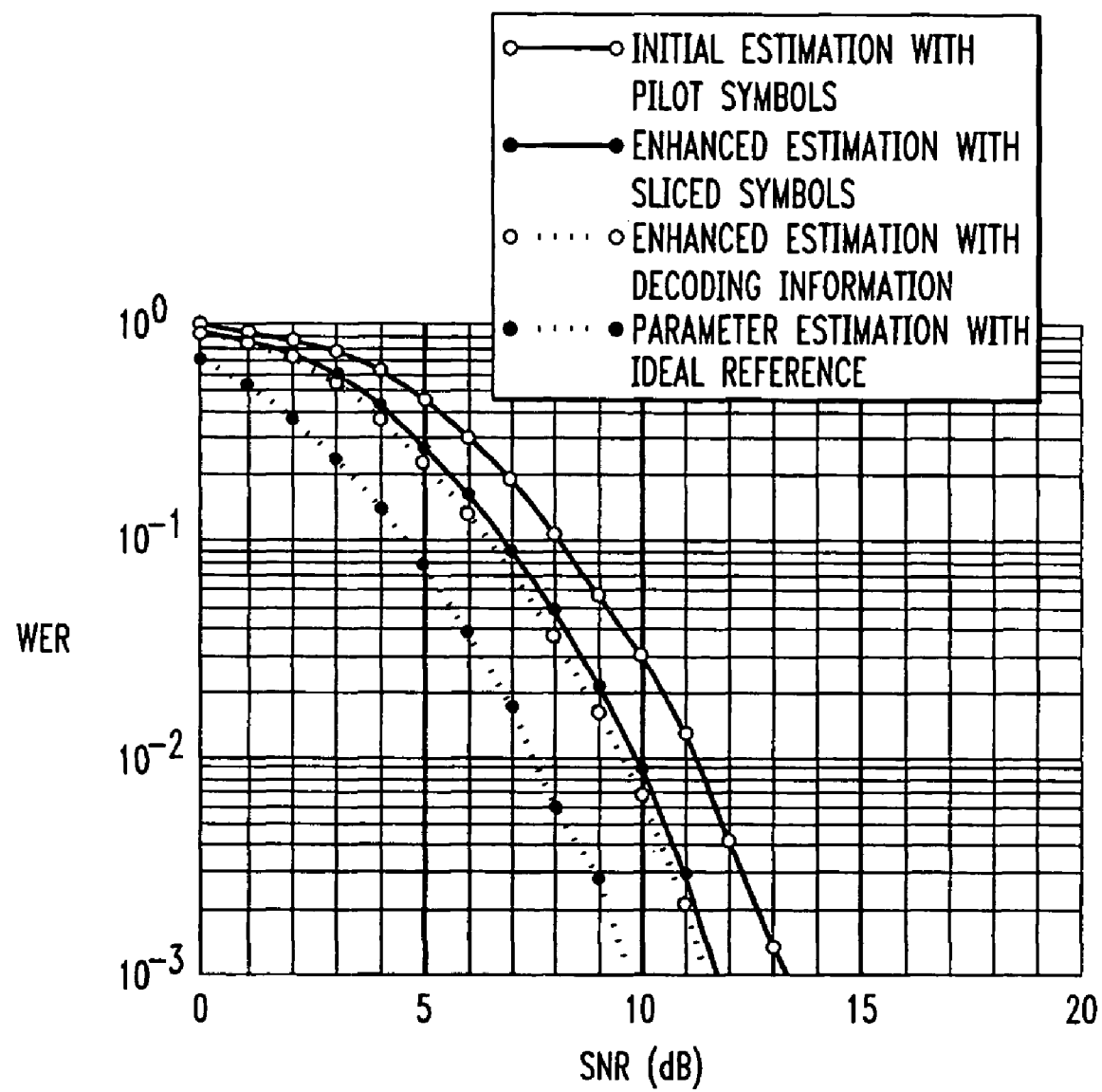
FIGS. 5a and 5b compare the effects on word error rate (WER) and the mean squared error (MSE) of different reference signals.
Figure 5B:
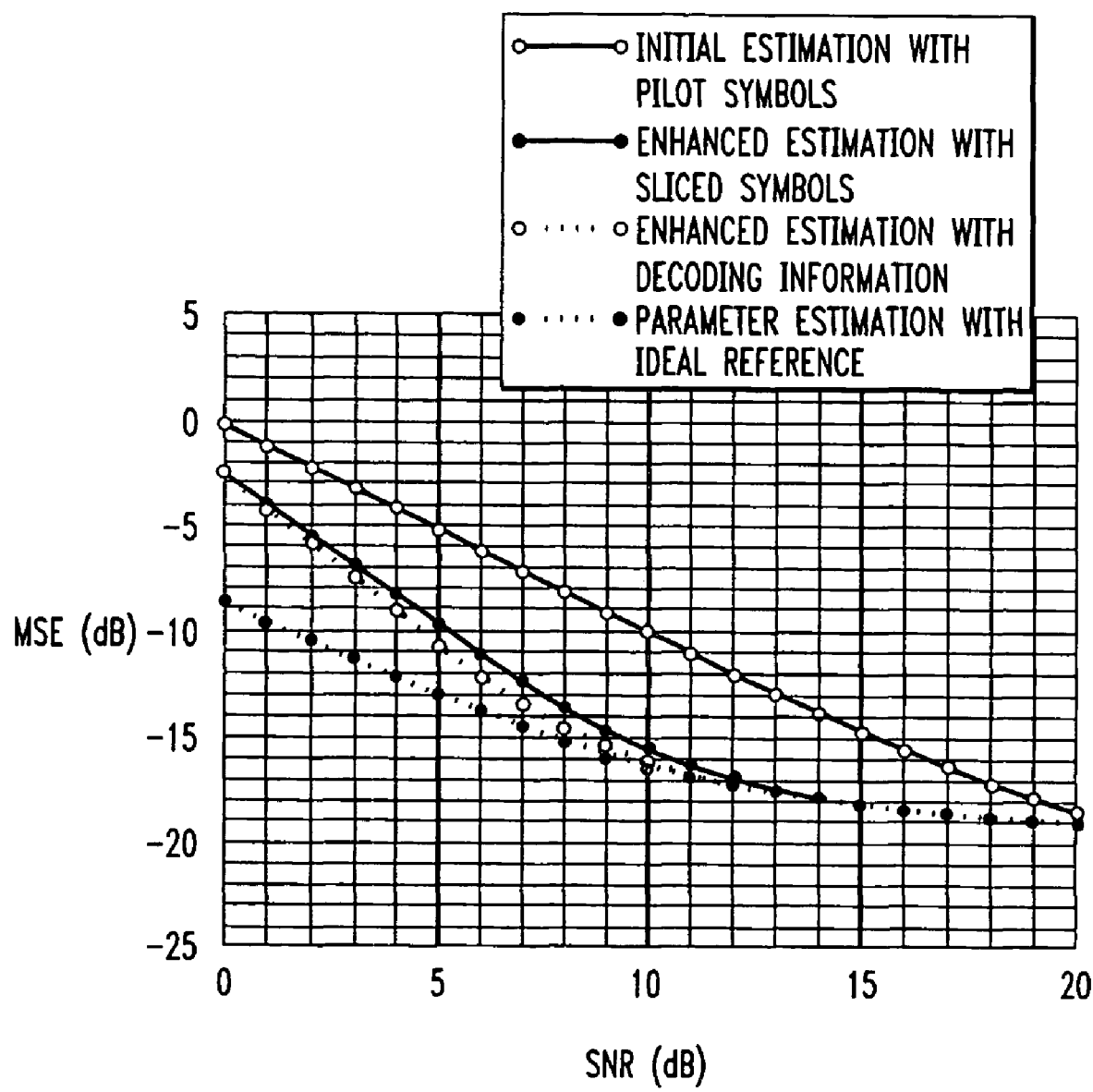
Figure 6A:
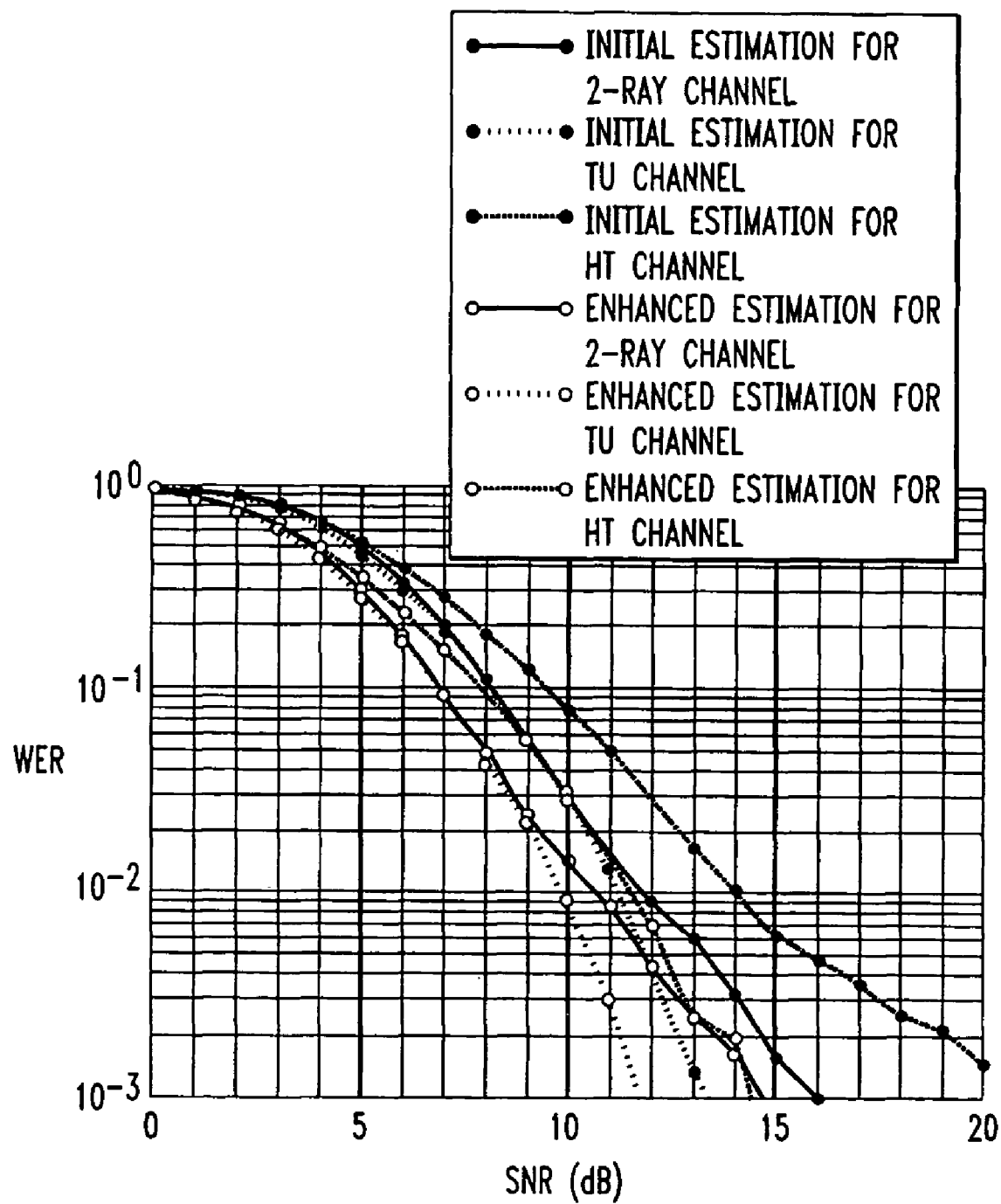
FIGS. 6a and 6b compare the effects on the WER and the MSE of using initial and the enhanced estimates for different channel models under a 40 Hz Doppler condition.
Figure 6B:
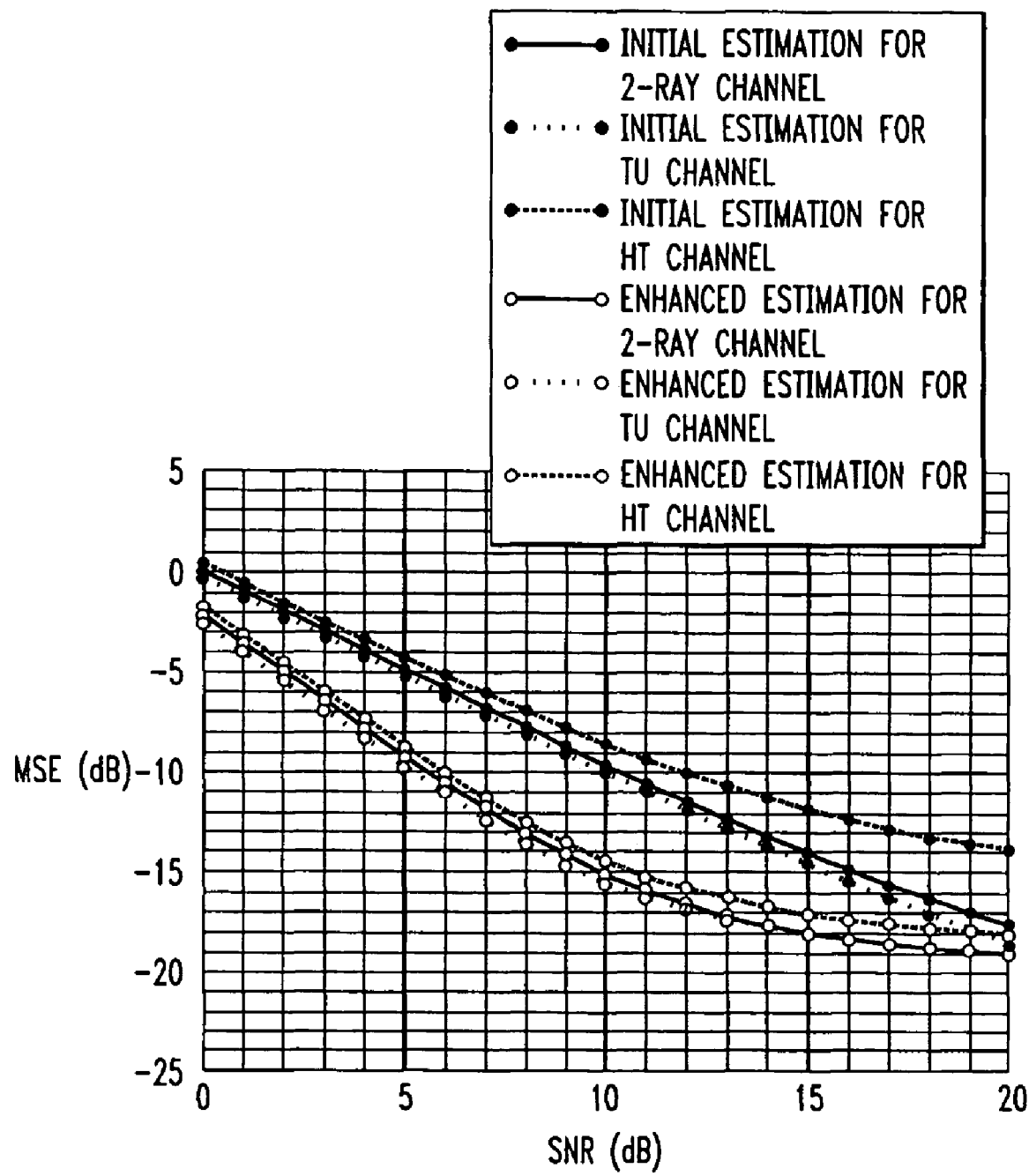
Figure 7A:
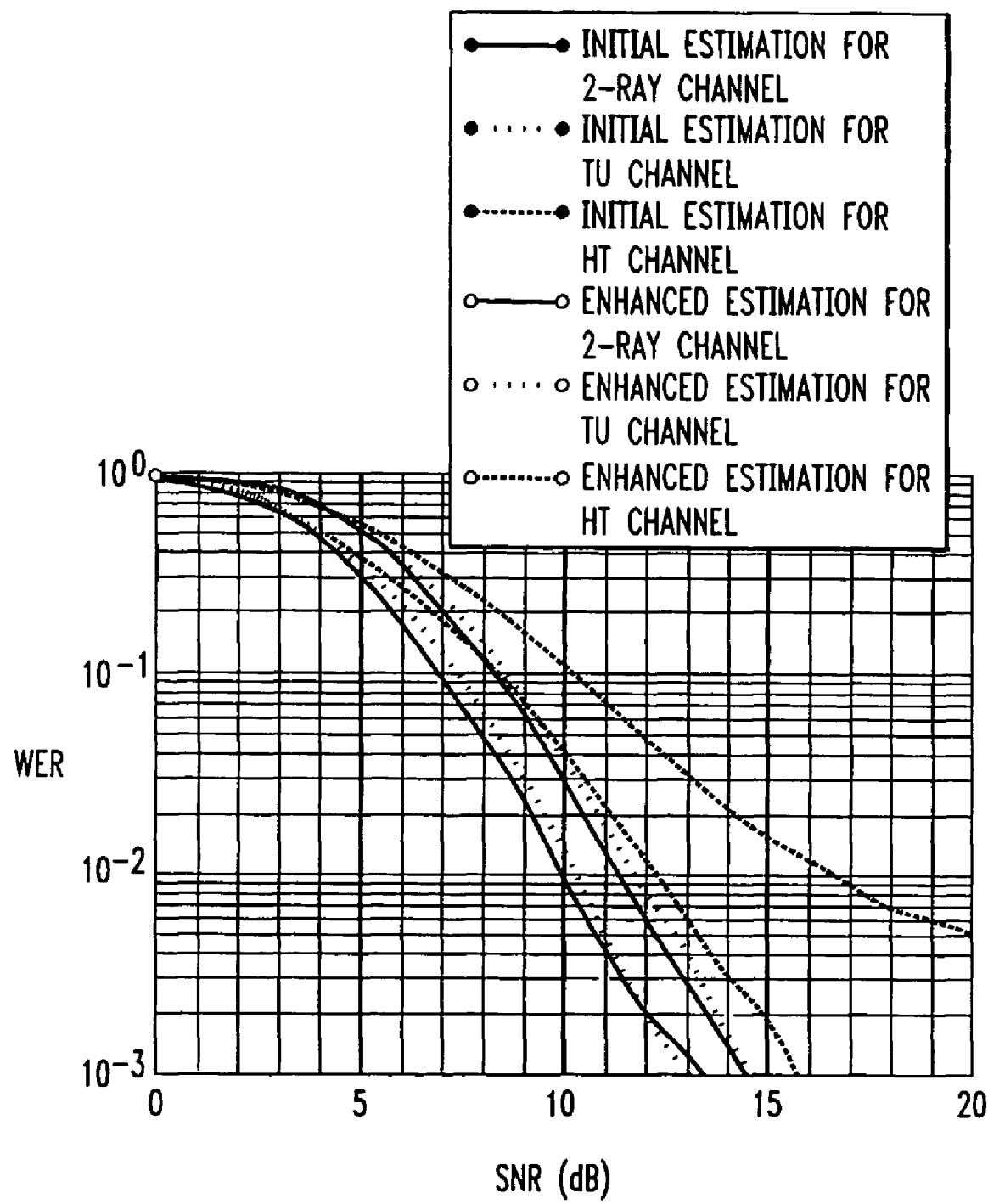
FIGS. 7a and 7b compare the effects on the WER and the MSE of using initial and the enhanced estimates for different channel models under a 200 Hz Doppler condition.
Figure 7B:
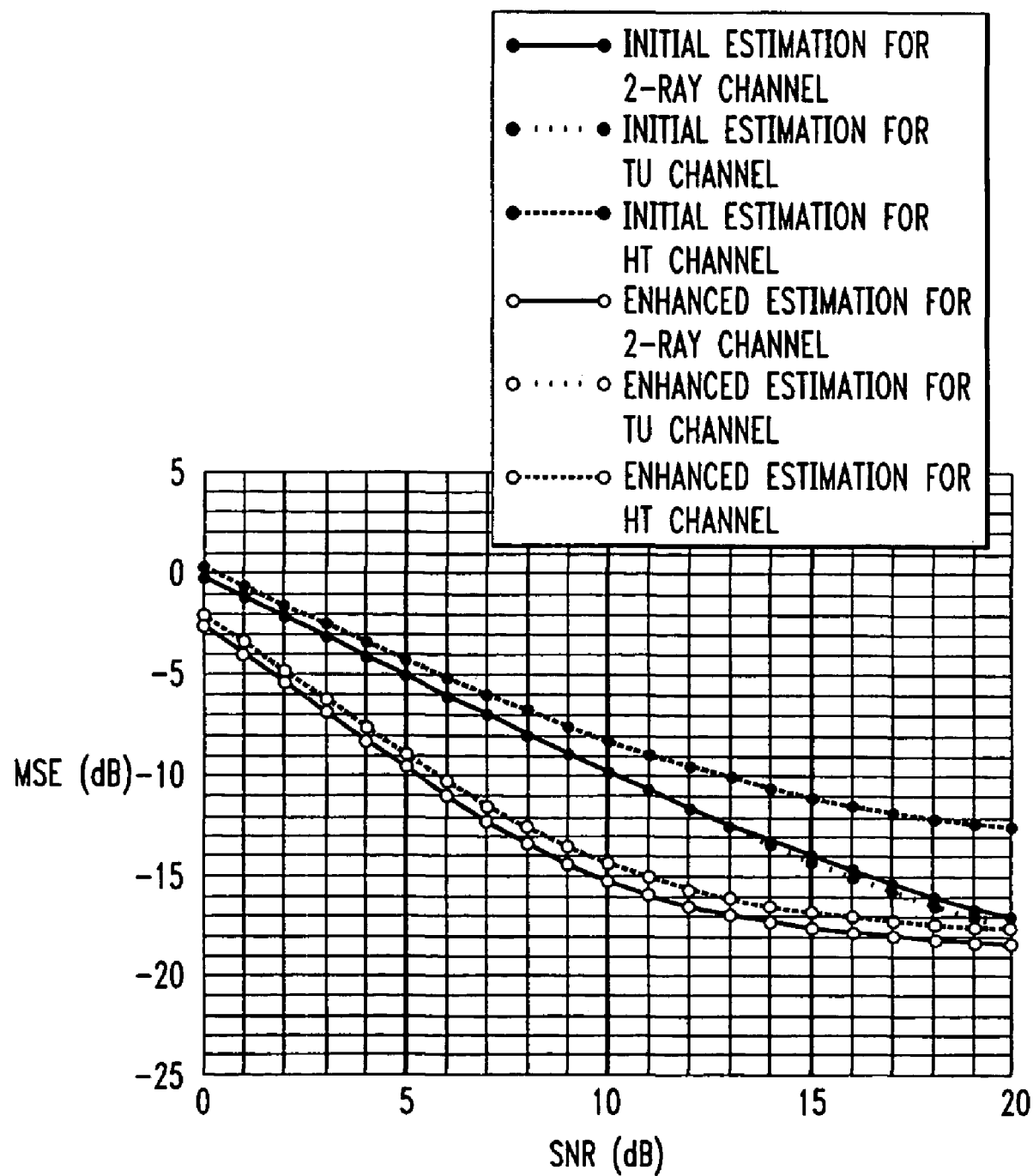

FIGS. 5a and 5b show the effects of different references on the word error rate (WER) and the mean squared error (MSE) of the OFDM system with the TU channel and 40 Hz Doppler frequency. From these figures, when 10% pilot symbols are used for initial estimation, the MSE of the estimated parameters is almost the same as the system's SNR. The required SNR's for 10% and 1% WER's are about 8 dB and 11.2 dB, respectively. When the decisioned (sliced) symbols along with the pilot symbols are used to enhance the channel parameter estimation, the performance of parameter estimation can be improved significantly, and the MSE of the enhanced estimator is reduced from −10 dB to −15.5 dB when SNR=10 dB. The required SNR's for 10% and 1% WER's are improved by about 1.4 dB. If the undecoded/decoded dual mode reference introduced in reference [8] is used, another 0.3 dB SNR improvement can be obtained. However, when an ideal reference is used for channel parameter estimation, the system performance is much better than that of initial or enhanced channel parameter estimation.

Parameter Estimation Performance Under Different Environments

FIGS. 6a, 6b and 7a, 7b show the performance of the initial and enhanced parameter estimators for channels with the two-ray (having a delay span of 5 μsec), TU, and HT delay profiles and 40 Hz and 200 Hz Doppler frequencies, respectively. From the figures, the system with a pilot-symbol-aided estimator is very robust to Doppler shift, and there are almost no performance degradations for the two-ray and TU channels and only 0.3 dB SNR degradation for the HT channel if $f_d$ is increased from 40 Hz to 200 Hz. The OFDM system for the two-ray and TU channels has almost the same performance, which is better than the system for the HT channel. The required SNR for a 10% WER is 7 dB for the two-ray and TU channels and about 8 dB for the HT channel.

Comparison with Decision-Directed Estimator Under Noise-Limited Performance

Figure 8A:
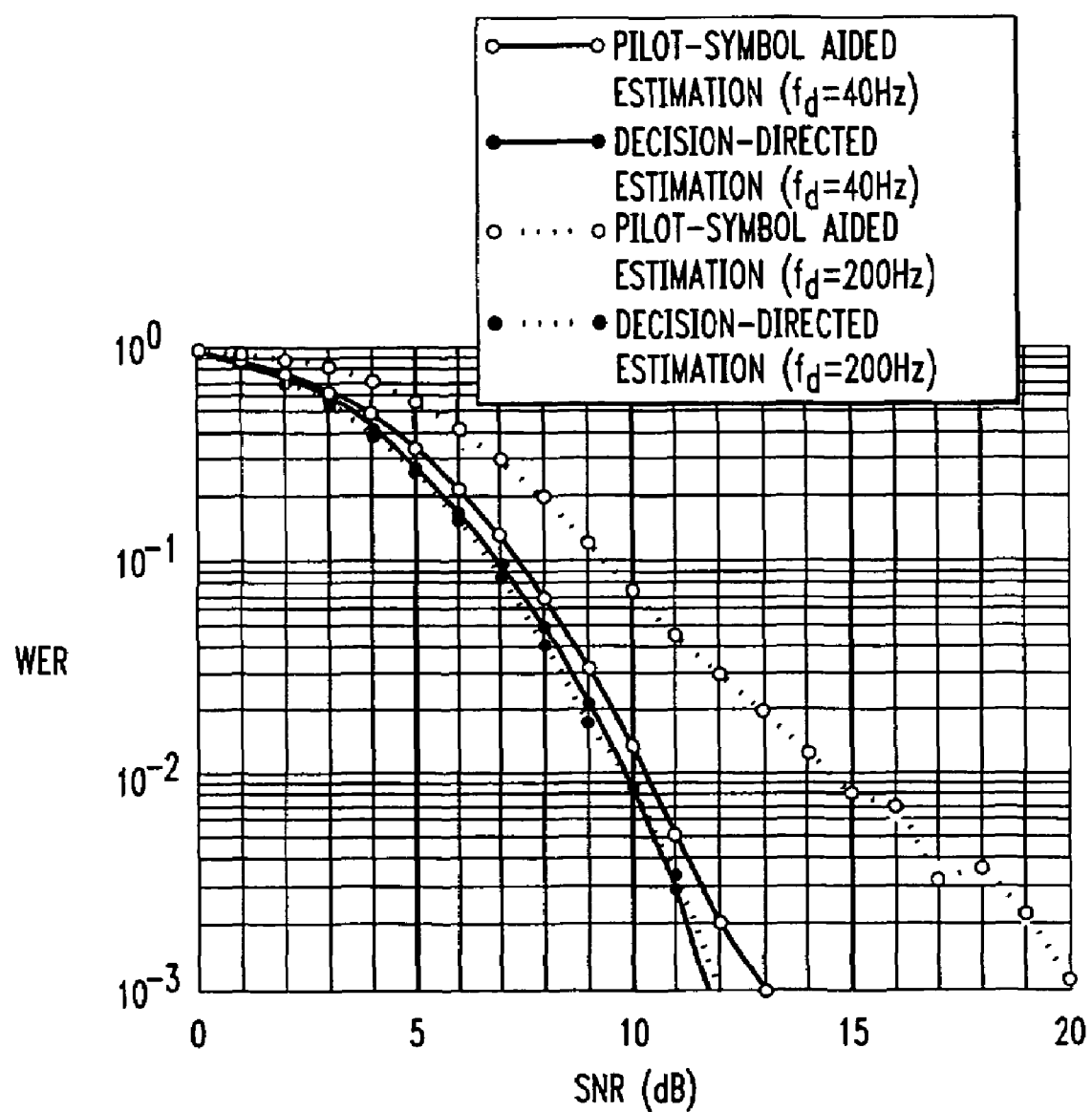
FIGS. 8a and 8b shows the effects on the WER of using different Doppler shifts for a TU channel model (FIG. 8a) and a HT channel model (FIG. 8b).
Figure 8B:
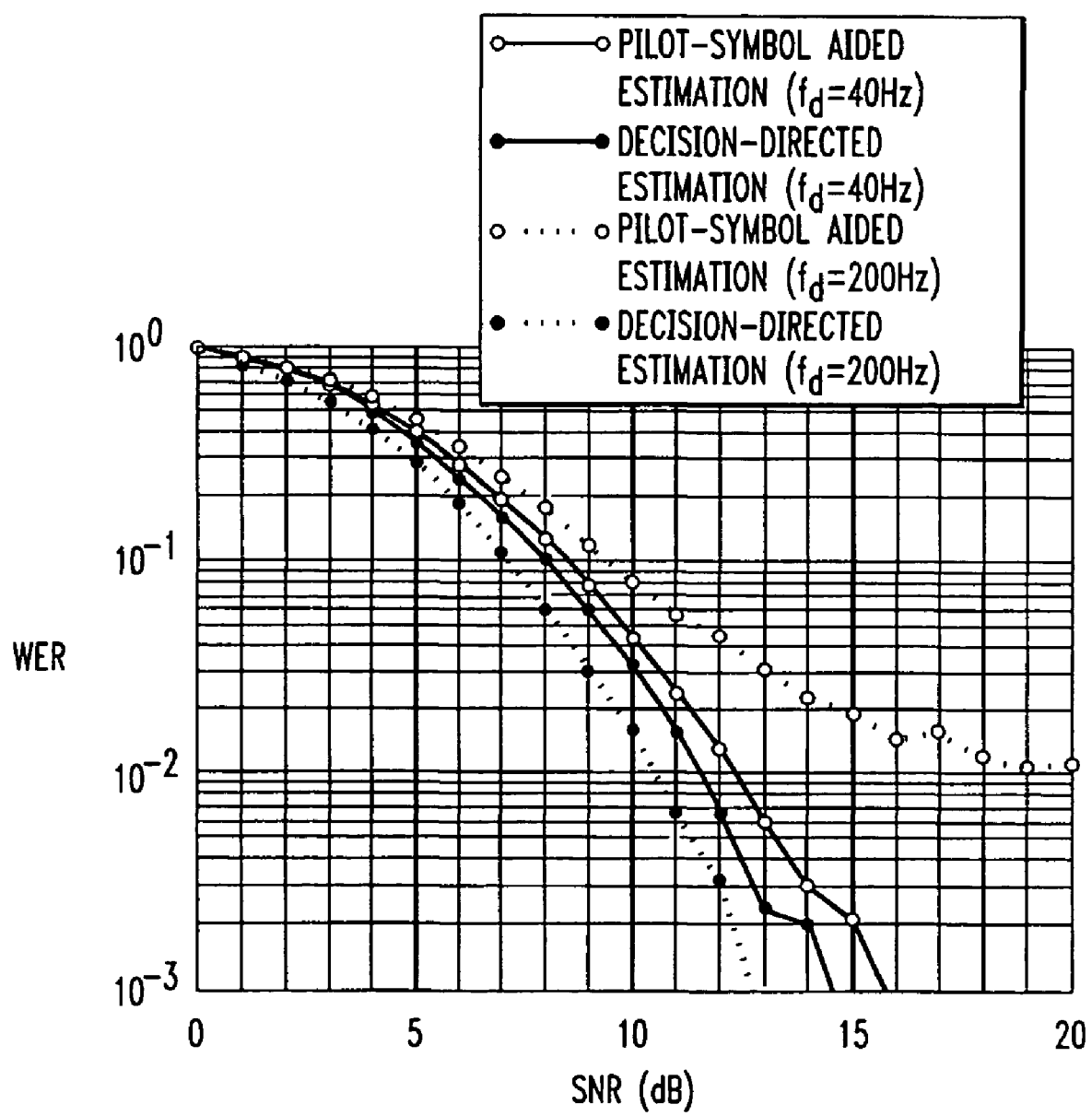

FIGS. 8a and 8b compare the pilot-symbol-aided and the decision-directed (see Reference [8]) estimators for an OFDM system with the TU and HT channels and 40 Hz and 200 Hz Doppler frequencies. From FIG. 8a, for the TU channel with $f_d$=200 Hz, the pilot-symbol-aided and the decision-directed estimators have the same performance and the required SNR's for 10% and 1% WER's are about 7 dB and 10 dB, respectively. However, for the TU channel with $f_d$=200 Hz, the performance of the decision-directed estimator is degraded significantly, and the required SNR for a 10% WER is as large as 9.3 dB while it is only about 7.3 dB for the pilot-symbol-aided estimator. FIG. 8b demonstrates the WER's of system for the HT channel. It shows that the decision-directed estimator is 1 dB better than the pilot-symbol-aided estimator for lower Doppler frequency ($f_d$=40 Hz); however, the pilot-symbol-aided estimator is much better for higher Doppler frequency ($f_d$=200 Hz).

From the foregoing simulation for evaluating pilot-symbol-aided channel parameter estimation for OFDM systems, it appears that robust interpolation using the 2-D FFT and IFFT, and enhanced parameter estimation can significantly improve the performance of OFDM in noise-limited wireless environments. Compared with decision-directed channel parameter estimator, the pilot-symbol-aided estimator is highly robust to Doppler, even though it has a slight performance degradation for systems with lower Doppler frequencies.

What is claimed is:

1. A method for processing an OFDM signal received over a wireless communication channel, said OFDM signal comprising a packet of a number N of OFDM blocks, each OFDM block comprising a number K of signal tones, the method comprising the steps of sequentially receiving N channel-impaired OFDM blocks;

computing noisy channel estimates, based on said channel-impaired blocks;

arranging the noisy channel estimates into a first array having a first axis representative of a frequency index of the noisy channel estimates and a second axis representative of a time index of the noisy channel estimates;

performing a two-dimensional inverse Fourier transform on said first array;

multiplying the inverse Fourier transformed first array with a second array representing a two-dimensional filter to thereby form a third array; and performing a two-dimensional Fourier transform on said third array to thereby form a fourth array comprising elements representative of an estimate of channel parameters for said wireless communication channel.

2. The method of claim 1, wherein the two-dimensional filter is a diamond shaped filter.

3. The method of claim 1, wherein said step of computing the noisy channel estimates is performed by multiplying the elements of each channel-impaired OFDM block with corresponding reference pilot symbol values known to have been inserted into that block upon transmission.

4. The method of claim 1, wherein said step of computing the noisy channel estimates is performed by multiplying the elements of each channel-impaired OFDM block with corresponding estimates of a demodulated signal.

5. The method of claim 1, wherein said step of computing the noisy channel estimates is performed by multiplying the elements of each channel-impaired OFDM block with corresponding estimates of a decoded signal.

6. The method of claim 1, wherein said step of sequentially receiving the N blocks is performed at a receiver by a plurality of antennas, each of said antennas sensing N channel-impaired blocks.

7. A method of estimating channel parameters for a wireless communication channel by transmitting a signal from a transmitter to a receiver, the method comprising the steps of:
- inserting pilot symbols at predetermined positions in a plurality of blocks, each block comprising a plurality of data symbols representative of a signal being transmitted;
- sequentially transmitting each of said plurality of blocks over a finite number of tones, said finite number of tones being broadcast substantially simultaneously for each block;
- sequentially receiving a corresponding plurality of channel-impaired blocks at the receiver;
- computing a corresponding plurality of noisy channel estimates from said plurality of channel-impaired blocks;
- arranging the plurality of noisy channel estimates into a first array having a first axis representative of a frequency index of the noisy channel estimates and a second axis representative of a time index of the noisy channel estimates;
- performing a two-dimensional inverse Fourier transform on said first array;
- multiplying the inverse Fourier transformed first array with a second array representing a two-dimensional filter to thereby form a third array; and
- performing a two-dimensional Fourier transform on said third array to thereby form a fourth array comprising elements representative of the channel parameters.

8. The method of claim 7, wherein said pilot symbols are inserted with a non-rectangular pattern in a 2-dimensional array that comprises tone bins along one dimension and time along the other dimension.

* * * * *